(12) United States Patent
Lozhkin (10) Patent No.: US 8,718,209 B2
(45) Date of Patent: May 6, 2014

(54) RECEIVING DEVICE, LINEARIZER, AND DISTORTION COMPENSATION METHOD

(75) Inventor: Alexander N Lozhkin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 13/110,641

(22) Filed: May 18, 2011

(65) Prior Publication Data

US 2011/0293051 A1 Dec. 1, 2011

(30) Foreign Application Priority Data

May 25, 2010 (JP) ................................. 2010-119458

(51) Int. Cl.
*H03D 1/06* (2006.01)

(52) U.S. Cl.
USPC .......................................... 375/346; 375/285

(58) Field of Classification Search
CPC . H04L 25/03038; H04L 25/08; H04L 27/368; H04L 27/2647; H04L 2025/03477; H04L 2025/03617; H04B 1/0475; H04B 1/10; H04B 1/123
USPC ........................... 375/259, 284, 285, 316, 346
See application file for complete search history.

(56) References Cited

U.S. PATENT DOCUMENTS

| 7,499,509 | B2 * | 3/2009 | Zhidkov | 375/346 |
| 7,663,436 | B2 | 2/2010 | Takano et al. | |
| 2002/0160715 | A1 * | 10/2002 | Davis et al. | 375/346 |
| 2004/0196921 | A1 * | 10/2004 | Matsumoto et al. | 375/285 |
| 2011/0004803 | A1 | 1/2011 | Yokomakura et al. | |
| 2011/0069749 | A1 * | 3/2011 | Forrester et al. | 375/232 |

FOREIGN PATENT DOCUMENTS

JP 2009-188640 A 8/2009
WO WO 2007/004252 1/2007

OTHER PUBLICATIONS

Ding, Lei et al., "A Robust Digital Baseband Predistorter Constructed Using Memory Polynomials", IEEE Transactions on Communications vol. 52, No. 1; Jan 1, 2004, pp. 159-165.

* cited by examiner

*Primary Examiner* — Betsy Deppe
(74) *Attorney, Agent, or Firm* — Fujitsu Patent Center (57) ABSTRACT

A receiving device which receives a signal transmitted from a transmitting device by using a power amplifier, the receiving device includes a calculating unit which performs distortion compensation on a symbol included in a reception signal, a delay unit which holds a signal for a result from the distortion compensation, and the calculating unit performing the distortion compensation on a second symbol at a timing later than a first symbol based on a coefficient corresponding to an amplification characteristic of the power amplifier and on the signal for the result from the distortion compensation with respect to the first symbol held by the delay unit.

21 Claims, 10 Drawing Sheets

RECEIVING DEVICE, LINEARIZER, AND DISTORTION COMPENSATION METHOD

CROSS-REFERENCE TO RELATED APPLICATION

This application is based upon and claims the benefit of priority of the prior Japanese Patent Application No. 2010-119458, filed on May 25, 2010, the entire contents of which are incorporated herein by reference.

FIELD

Embodiments discussed herein are related to a receiving device, a linearizer, and a distortion compensation method.

BACKGROUND

In a radio communication system in which a signal is radio-transmitted from a transmitting device to a receiving device, the transmitting device transmits the signal by using a power amplifier. The power amplifier may have a nonlinear amplification characteristic, that is, a characteristic in which a relation between an input signal and an output signal is nonlinear. The nonlinear characteristic of the power amplifier may cause Intermodulation Distortion (IMD) in the signal transmitted by the transmitting device. The IMD may cause Intersymbol Interference (ISI) and Interchannel Interference (ICI). Therefore, in the receiving device that receives a signal that is distorted due to the nonlinear characteristic of the power amplifier, a reception quality such as a Bit Error Rate (BER) may deteriorate.

To address the above-described problem, a predistortion method as a method for linearizing the nonlinear characteristic of the power amplifier is performed. For the predistortion method, a predistorter is provided as a linearizer in the transmitting device. The predistorter adds distortion with a reverse characteristic of the amplification characteristic of the power amplifier to a signal before the signal is input into the power amplifier. By transmitting the signal added with the distortion of the reverse characteristic through the power amplifier, the nonlinear distortion of the amplified signal with respect to the signal before the signal is input into the predistorter is suppressed. The nonlinear distortion caused by the power amplifier may be compensated in the transmitting device by using the predistorter.

In the power amplifier, nonlinear distortion may be caused by a so-called memory effect. Regarding the memory effect, the power amplification corresponding to a symbol is influenced by a symbol that is input earlier than this symbol. The memory effect may be generated by influence such as a filter delay, a frequency response of a matched circuit, nonlinear capacitance, a response speed of a bias network, for example. To address the above-described problem, there is a proposal of a power amplifier that compensates the nonlinear distortion caused by the memory effect (for example, see International Publication Pamphlet No. 2007/004252).

Regarding the receiving device used in the radio communication system, there is a turbo equalization technique for detecting data before the data is decoded by repeating processing by an equalizing unit that compensates the distortion and the decoding unit that performs error correcting processing (see, for example, Japanese Laid-open Patent Publication No. 2009-188640).

For the method for compensating the distortion caused by the memory effect of the power amplifier, the effectiveness of distortion compensation may be further improved. That is, calculation of the reverse characteristic of the amplification characteristic of the power amplifier with accuracy is not easy, so that the accuracy of predistortion is unlikely to be improved. Compared to predistortion in consideration of the memory effect, a predistortion algorithm in consideration of the memory effect is more complicated than the predistortion algorithm without consideration of the memory effect, so that the circuit of the predistorter is complicated.

SUMMARY

According to an aspect of the embodiments discussed herein, a receiving device which receives a signal transmitted from a transmitting device by using a power amplifier, the receiving device includes a calculating unit which performs distortion compensation on a symbol included in a reception signal, a delay unit which holds a signal for a result from the distortion compensation, and the calculating unit performing the distortion compensation on a second symbol at a timing later than a first symbol based on a coefficient corresponding to an amplification characteristic of the power amplifier and on the signal for the result from the distortion compensation with respect to the first symbol held by the delay unit.

The object and advantages of the embodiments will be realized and attained by at least the features, elements and combinations particularly pointed out in the appended claims.

It is to be understood that both the foregoing general description and the following detailed description are exemplary and explanatory and are not restrictive of the embodiments, as claimed.

DESCRIPTION OF EMBODIMENTS

First Embodiment

Figure 1:
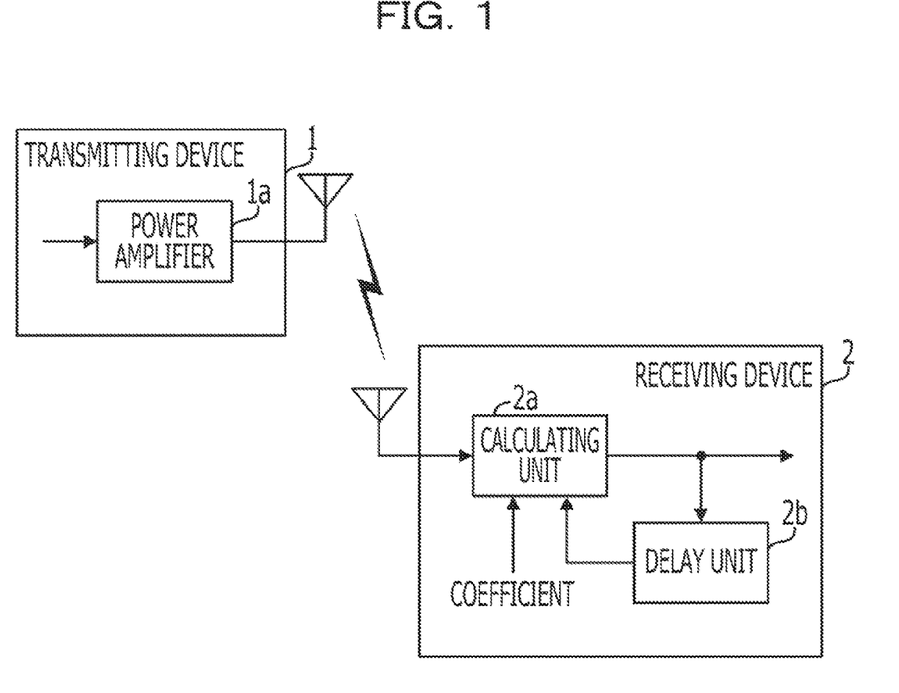
FIG. 1 is a diagram illustrating a radio communication system according to a first embodiment.

FIG. 1 is a diagram illustrating a radio communication system according to a first embodiment. The radio communication system according to the first embodiment includes a transmitting device 1 and a receiving device 2. A signal is radio-transmitted from the transmitting device 1 to the receiving device 2. Either a fixed radio communication system or a mobile communication system is applicable as the radio communication system. For example, a base station, a relay station, a mobile station, and the like may be used as the transmitting device 1 and the receiving device 2.

The transmitting device 1 has a power amplifier 1a. The power amplifier 1a has a nonlinear amplification characteristic due to the memory effect. The transmitting device 1 amplifies and radio-transmits a signal by using the power amplifier 1a. The transmitting device 1 may include a predistorter (for example, a predistorter that does not consider the memory effect, a distortion compensator that does not sufficiently perform distortion compensation of the memory effect, or the like). The predistorter performs distortion compensation by distorting a signal before the signal is input into the power amplifier 1a.

The receiving device 2 receives the signal that is transmitted from the transmitting device 1 by using the power amplifier 1a. The receiving device 2 includes a calculation unit 2a and a delay unit 2b. The calculation unit 2a performs the distortion compensation on a symbol that is included in the reception signal. The delay unit 2b holds a signal of a result from the distortion compensation performed by the calculation unit 2a. The reception signal includes a first symbol and a second symbol at a timing later than the first symbol. At this time, the calculation unit 2a performs the distortion compensation on the second symbol based on a coefficient corresponding to the amplification characteristic of the power amplifier 1a and on the signal of the result from the distortion compensation with respect to the first symbol held by the delay unit 2b.

At this time, if the reception signal includes a plurality of symbols in a time string, the calculation unit 2a may perform the distortion compensation on each symbol and processing for updating the signal held by the delay unit 2b into the signal with respect to the result from the distortion compensation repeatedly by symbol unit. The second symbol may follow the first symbol.

The calculation unit 2a may output a posteriori possibility of the symbol as a result from the distortion compensation with respect to the symbol. The delay unit 2b may hold the posteriori possibility output from the calculation unit 2a as a signal with respect to the result from the distortion compensation. The calculation unit 2a may use a nonlinear function to calculate a posteriori possibility of the received symbol based on the coefficient corresponding to amplification characteristic and the posteriori possibility held by the delay unit 2b.

The coefficient corresponding to the amplification characteristic of the power amplifier 1a used by the calculation unit 2a may be calculated and set in advance to the receiving device 2. If there are various types of power amplifiers with various amplification characteristics as power amplifiers that may be used by a communication partner of the receiving device 2, various coefficients are set to the receiving device 2, and the coefficient to be used may be selected according to a communication environment.

The signal handled by the calculation unit 2a and the delay unit 2b may be a signal corresponding to a result of soft decision (to decide whether a bit is 0 or 1 on multiple stages). On a latter stage of the calculation unit 2a, a decoding unit that decodes the signal that is subjected to the distortion compensation is provided. The decoding unit may obtain the signal subjected to the soft decision as an input signal and may obtain the signal subjected to hard decision (to decide whether the bit is 0 or 1). In the latter case, a hard decision unit that performs the hard decision of a symbol is provided between the calculation unit 2a and the decoding unit.

In the receiving unit 2 according to the first embodiment, the calculation unit 2a performs the distortion compensation on the first symbol included in the reception signal from the transmitting device 1 that transmits the signal by using the power amplifier 1a. The delay unit 2b holds the signal with respect to the result from the distortion compensation performed on the first symbol. Based on the coefficient corresponding to the amplification characteristic of the power amplifier 1a and on the signal of the result from the distortion compensation performed on the first symbol held by the delay unit 1b, the calculation unit 2a performs the distortion compensation on the second symbol at the timing that is later than the first symbol.

As a result, the distortion caused by the memory effect of the power amplifier 1a may be effectively eased by the receiving device 2. That is, the receiving device 2 feedbacks the result from the distortion compensation performed on a symbol to compensate the distortion of another symbol that follows the symbol. Therefore, accuracy of the distortion compensation may be improved even though the reverse characteristic of the amplification characteristic of the power amplifier 1a having the memory effect is not calculated with accuracy. The transmitting device 1 is not desired to include a predistorter mounted with a complex algorithm. The circuit configuration of the transmitting device 1 may be simplified.

If linearization of the power amplifier 1a is performed by the receiving device 2, the influence of the additive noise added to the reception signal of the receiving device 2 is eased in addition to the distortion caused by the power amplifier 1a. That is, the entire interference that includes the intermodulation distortion and the additive noise may be suppressed. Accordingly, the reception quality such as a bit error rate in the receiving device 2 may be improved, so that the radio communication with high quality may be achieved.

The transmitting device 1 and the receiving device 2 may use, for example, Code Division Multiplex (CDM) and Quadrature Frequency Division Multiplexing (OFDM) as a multiplexing method. The linearizer that includes the calculation unit 2a and the delay unit 2b may be mounted as an independent circuit component. In this case, the linearizer may be embedded in the receiving device 2 in a latter stage.

Second Embodiment

Figure 2:
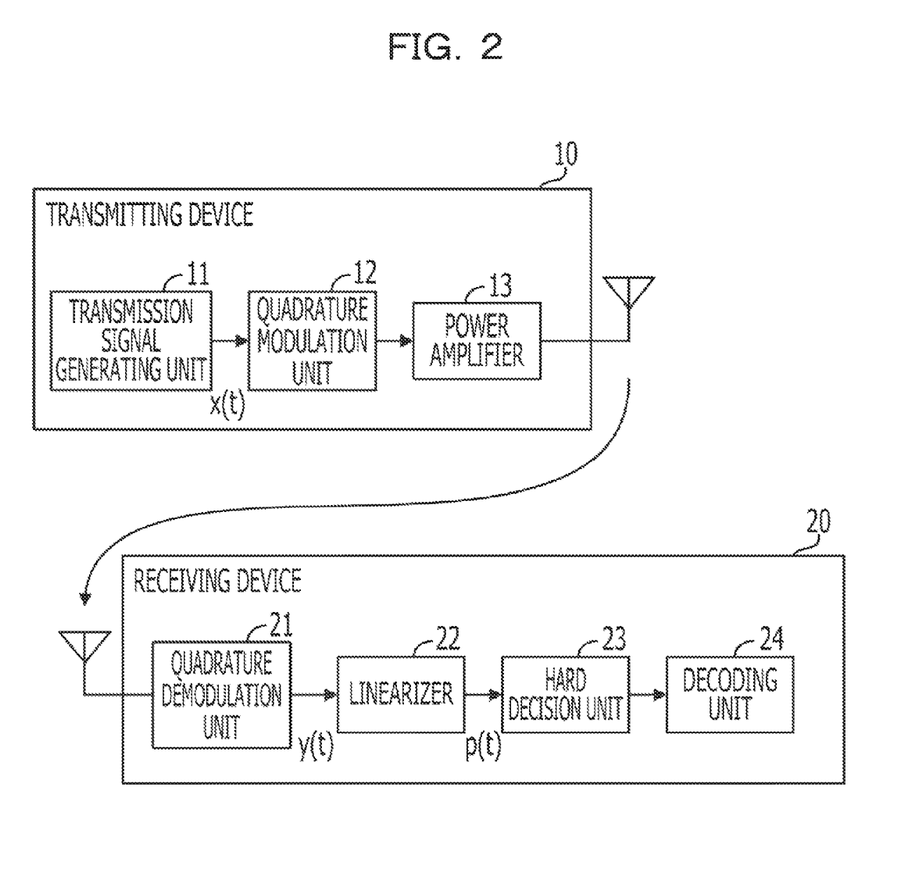
FIG. 2 is a block diagram illustrating a radio communication system according to a second embodiment.

FIG. 2 is a block diagram illustrating a radio communication system according to a second embodiment. The radio communication system according to the second embodiment includes a transmitting device 10 and a receiving device 20. The transmitting device 10 radio-transmits a signal to the receiving device 20.

The radio communication system may be realized as a mobile communication system, for example. For example, a base station, a relay station, a mobile station, and the like may be used as the transmitting device 10 and the receiving device 20. That is, downlink transmission from the base station to the mobile station and uplink transmission from the mobile station to the base station are assumed to be transmission of the signal from the transmitting device 10 to the receiving device 20. The transmitting device 10 includes a transmission signal generating unit 11, a quadrature modulation unit 12, and a power amplifier 13. The receiving device 20 includes a quadrature demodulating unit 21, a linearizer 22, a hard-decision unit 23, and a decoding unit 24.

The transmission signal generating unit 11 generates a baseband signal (a signal x (t)) as a transmission signal. The generated transmission signal is subjected to error correction coding. The quadrature modulation unit 12 quadrature-modulates the transmission signal. That is, for each of an Inphase (I) component and a Quadrature (Q) component, the baseband signal as the transmission signal is up-converted into a high-frequency signal. The power amplifier 13 power-amplifies the signal that is subjected to the quadrature modulation. For example, a High Power Amplifier (HPA) may be used as the power amplifier 13. The signal subjected to the power amplification is radio-output through an antenna included in the transmitting device 10. The power amplifier 13 has the nonlinear amplification characteristic due to the memory effect.

The quadrature demodulation unit 21 quadrature-demodulates the signal received from the transmitting device 10 through the antenna included in the receiving device 20. That is, for each of the I component and the Q component, the high frequency signal as the reception signal is down-converted into a baseband signal. Under consideration of the memory effect, the linearizer 22 linearizes the nonlinear amplification characteristic of the power amplifier 13. That is, the linearizer 22 performs the distortion compensation on the reception signal (a signal y (t)) that is subjected to the quadrature demodulation. The distortion compensation suppresses interference caused by an additive noise. The hard decision unit 23 performs the hard decision on a signal p (t) that is subjected to the distortion compensation by symbol unit. The decoding unit 24 performs correction decoding on the signal that is subjected to the hard decision.

The transmitting device 10 and the receiving device 20 may include another circuit between blocks illustrated in FIG. 2. For example, the transmitting device 10 and the receiving device 20 may include a Low Pass Filter (LPF), a Band Pass Filter (BPF), or the like. The transmitting device 10 may have a predistorter (for example, a predistorter of which the memory effect is not considered) between the transmission signal generating unit 11 and the quadrature modulation unit 12. The decoding unit 24 may perform error correction decoding by using the signal that is not subjected to the hard decision (the signal subjected to soft decision). In this case, the hard decision unit 23 is not desired to be provided between the linearizer 22 and the decoding unit 24.

To describe distortion compensation operations performed by the linearizer 22, a model example indicating the nonlinear characteristic of the power amplifier 13 having the memory effect is defined. In this case, the nonlinear characteristic is expressed by using a Volterra series. The Volterra series expresses a nonlinear function as a polynomial. The formula (1) indicates an example of the Volterra series.

$$z(t) = \sum_{q=0}^{Q} x(t-q)h_1(q) + \sum_{q_1,q_2=0}^{Q} x(t-q_1)x(t-q_2)h_2(q_1, q_2) \quad (1)$$

In the formula (1), x (t) is an input signal of a symbol, x (t−1) is an input signal before x (t), z (t) is an output signal corresponding to the input signal x (t). Moreover, $h_1$ (q) is a primary Volterra kernel, and $h_2$ ($q_1$, $q_2$) is a secondary Volterra kernel. The Volterra kernels $h_1$(q) and $h_2$ ($q_1$, $q_2$) are calculated in advance based on the amplification characteristic of the power amplifier 13.

By extending the formula (1), the formula (2) is obtained. As indicated in the formula (2), the output signal z (t) that includes the nonlinear distortion may be calculated using the input signals x (t) and x (t−1), and the Volterra kernels $h_1$ (0), $h_1$ (1), $h_2$ (0, 0), $h_2$ (0, 1), and $h_2$ (1, 1). That is, in this nonlinear model, the output signal of a symbol (a timing t) is affected by the input signal of the previous symbol (a timing t−1). The input signal, the Volterra kernel and the output signal may be expressed in a complex number, for example.

$$z(t) = x(t)h_1(0) + x(t-1)h_1(1) + x(t)x(t)h_2(0, 0) + \\ x(t)x(t-1)h_2(0, 1) + x(t-1)x(t-1)h_2(1, 1) \quad (2)$$

The model defined by the formulas (1) and (2) is an example of the model indicating the nonlinear characteristic of the power amplifier 13. The model that is applicable to the second embodiment is not limited to this model. For example, a Volterra series that is equal to or larger than 3 may be used, and a modeling method other than the Volterra series extension may be used as well. The nonlinear model using Volterra series is described in the following document, for example.

Lei Ding, et al., "A Robust Digital Baseband Predistorter Constructed Using Memory Polynomials", IEEE Transactions on Communications, Vol. 52, No. 1, January 2004.

Figure 3:
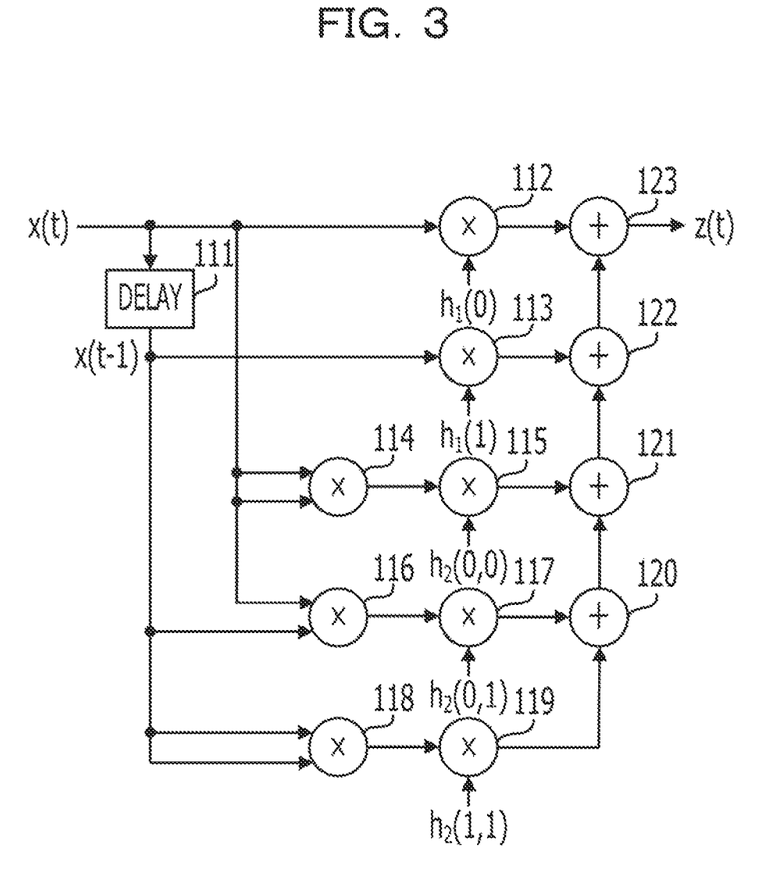
FIG. 3 is a block diagram illustrating a model example of a power amplifier that has a memory effect.

FIG. 3 is a block diagram illustrating a model example of a power amplifier having the memory effect. The block diagram illustrated in FIG. 3 illustrates an embodiment of a circuit that performs nonlinear calculation of the formula (2). The circuit includes a delay unit 111, multipliers 112 to 119, and adders 120 to 123.

The delay unit 111 delays the input signal by 1 symbol time. That is, the delay unit 111 outputs an input signal x (t−1) at the timing t. The multiplier 112 multiplies the input signal x (t) at the timing t by h1 (0). The multiplier 113 multiplies x (t−1) by $h_1$ (1). The multiplier 114 raises x (t) to the second power. The multiplier 115 multiplies the output of the multiplier 114 by $h_2$ (0, 0). The multiplier 116 multiplies x (t) by x (t−1). The multiplier 117 multiplies the output of the multiplier 116 by $h_2$ (0, 1). The multiplier 118 raises x (t−1) to the second power. The multiplier 119 multiplies the output of the multiplier 118 by $h_2$ (1, 1).

The adder 120 adds the output of the multiplier 117 to the output of the multiplier 119. The adder 121 adds the output of the adder 120 to the output of the multiplier 115. The adder 122 adds the output of the adder 121 to the output of the multiplier 113. The adder 123 adds the output of the adder 122 to the output of the multiplier 112 and outputs the result as an output signal z (t) at the timing t.

Figure 4:
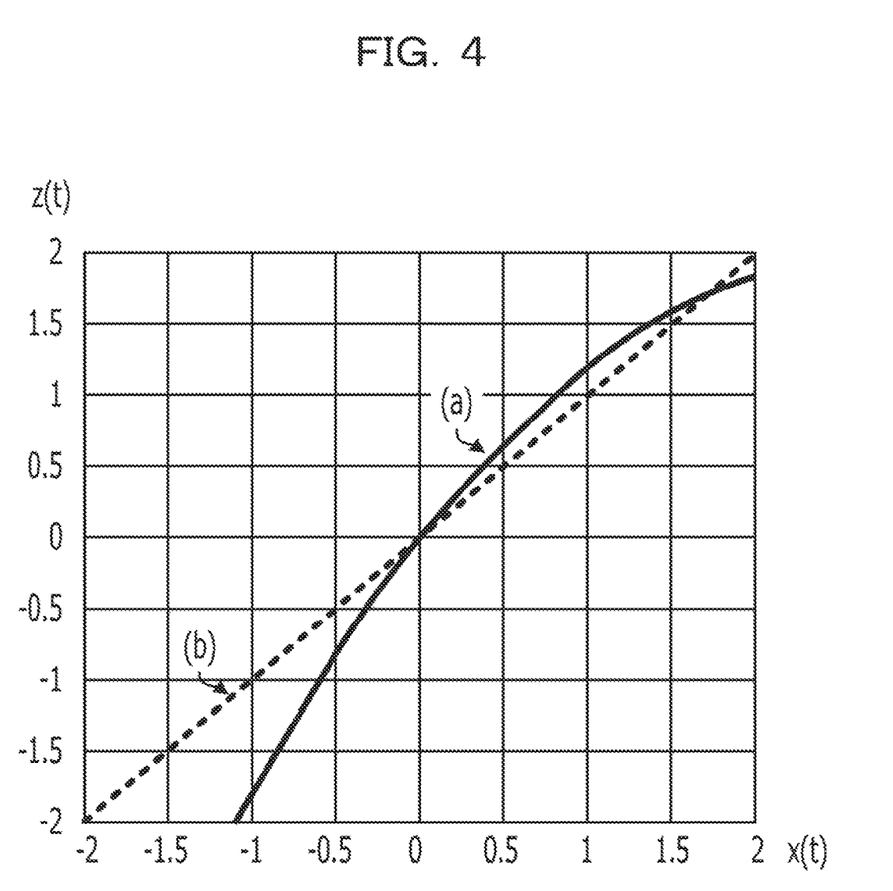
FIG. 4 is a graph illustrating an AM-AM characteristic of a model example of a power amplifier.

FIG. 4 is a graph illustrating an amplification-amplification (AM-AM) characteristic of a model example of a power amplifier. In the graph illustrated in FIG. 4, the transverse axis corresponds to an amplitude of the input signal x (t), and the longitudinal axis corresponds to the amplitude of the output signal z (t). A curved line (a) indicates the AM-AM characteristic of the nonlinear circuit illustrated in FIG. 3. In contrast, the curve line (b) (a straight line in this case) indicates the AM-AM characteristic of a linear circuit where an ideal power amplifier with a liner amplification characteristic is assumed. As illustrated in FIG. 4, the amplitude of the output signal z (t) of the nonlinear circuit illustrated in FIG. 3 is deviated from the ideal amplitude in the range where the input signal x (t) is smaller than 0 and larger than approximately 1.75. In the range where the input signal x (t) is larger than 0 and is smaller than approximately 1.75, the amplitude of an output signal z (t) of the nonlinear circuit is deviated from the ideal amplitude in the positive direction. As described above, in the model defined by the formulas (1) and (2), nonlinear distortion is caused in the output signal z (t).

Operations of the distortion compensation performed by the linearizer 22 will be described by using the model of nonlinear characteristic of the power amplifier 13 defined in the formulas (1) and (2). According to the second embodiment, the linearizer 22 employs an idea of Markov chain to compensate the nonlinear distortion. The linearizer 22 estimates a Maximum A Posteriori probability of each symbol based on the reception signal. Due to this, intermodulation distortion and additive noise caused by the memory effect of the power amplifier 13 suppress the influence on bit determination.

To simplify the description, the transmitting device 10 is assumed to transmit a signal by using Binary Phase Shift Keying (BPSK) as a modulation method. That is, 1 bit (0 or 1) is expressed with one symbol. Here, bit=0 is expressed as x (t)=+A, and bit=1 is expressed as x (t)=−A. In this case, A is a positive real number. The bit (0 or 1) may be determined based on whether the symbol is positive or negative.

In the nonlinear model defined in the formula (2), the output signal of a symbol is affected by the input signal of the previous symbol. That is, intersymbol interference is generated between the symbol and the previous symbol. When the above-described modulation method is used, any of four output signals $z_1$ to $z_4$ illustrated in the formula (3) is output from the circuit illustrated in FIG. 3.

$$z_1 = Ah_1(0) + Ah_1(1) + A^2h_2(0,0) + A^2h_2(0,1) + A^2h_2(1,1)$$

$$z_2 = Ah_1(0) - Ah_1(1) + A^2h_2(0,0) - A^2h_2(0,1) + A^2h_2(1,1)$$

$$z_3 = -Ah_1(0) + Ah_1(1) + A^2h_2(0,0) - A^2h_2(0,1) + A^2h_2(1,1)$$

$$z_4 = -Ah_1(0) - Ah_1(1) + A^2h_2(0,0) + A^2h_2(0,1) + A^2h_2(1,1) \quad (3)$$

In this case, $z_1$ is z (t) that is output in a case of x (t)=+A and x (t−1)=+A. In this case, $z_2$ is z (t) in a case of x (t)=+A and, x (t−1)=−A. In this case, $z_3$ is z (t) in a case of x (t)=−A and x (t−1)=+A. In this case, $z_4$ is z (t) in a case of x (t)=−A and x (t−1)=−A. In this manner, there may be a mode in which the output signal z (t) is determined based on the input signals x (t) and x (t−1).

It may be defined that the receiving device 20, which communicates with the transmitting device 10, may receive the reception signal on which z (t) output from the power amplification 13 and the additive noise are superimposed. The formula (4) indicates a model of the reception signal in the receiving device 20. In the formula (4), y (t) indicates a reception signal, and n (t) indicates a white Gaussian noise. The reception signal, the transmission signal, and the white Gaussian noise may be expressed in a complex number, for example.

$$y(t) = z(t) + n(t) \quad (4)$$

The linearizer 22 estimates a posteriori probability of the transmission signal x (t) from the reception signal y (t). The hard decision may be performed according to, for example, the formula (5) or the formula (6). In the former case, the determination is performed by comparing the posteriori probability to the threshold value (for example, 1). In the latter case, the determination is performed by comparing a log of the posteriori probability of the posteriori probability to the threshold value (for example, 0). The decision obtained by the formula (5) equals to the decision obtained by the formula (6). The decision indicates bit=0 if the condition of the formula (5) or the formula (6) is fulfilled. The decision indicates bit=1 if the condition of the formula (5) or the formula (6) is not fulfilled. According to the second embodiment, the linearizer 22 outputs a signal (a signal p (t)) corresponding to the left-hand side of the formula (6).

$$\frac{P(x(t) = +A \mid y(t))}{P(x(t) = -A \mid y(t))} > 1 \quad (5)$$

$$\ln P(x(t) = +A \mid y(t)) - \ln P(x(t) = -A \mid y(t)) > 0 \quad (6)$$

Figure 5:
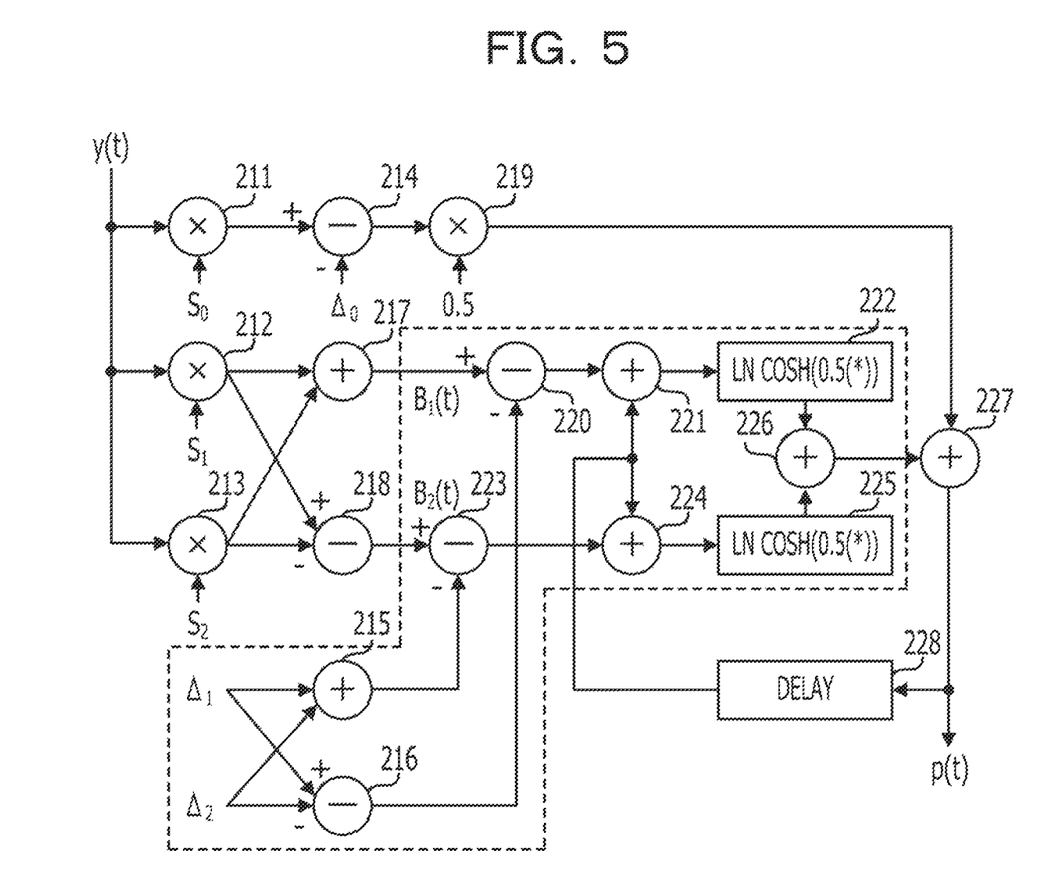
FIG. 5 is a block diagram illustrating details of a linearizer.

An embodiment of the linearizer 22 will be described below. Based on the description and the model of the power amplifier 13, the linearizer may be mounted. FIG. 5 is a block diagram illustrating details of a linearizer. The linearizer 22 includes correlators 211 to 213, subtracters 214, 216, 218, 220, and 223, a multiplier 219, adders 215, 217, 224, 226, and 227, nonlinear units 222 and 225, and a delay unit 228.

The correlator 211 multiplies y (t) by a reference signal $S_0$ set in advance and calculates a correlation therebetween. The correlator 212 multiplies y (t) by a reference signal $S_1$ set in advance and calculates a correlation therebetween. The correlator 213 multiplies y (t) by a reference signal $S_2$ set in advance and calculates a correlation therebetween. A matched filter may be used as the correlators 211 to 213. The reference signals $S_0$, $S_1$, and $S_2$ as parameters use the Volterra kernel as a coefficient corresponding to the amplification characteristic of the power amplifier 13 and are defined as the formula (7).

$$S_0 = 4Ah_1(0), S_1 = 2Ah_1(1), S_2 = 2A^2h_2(0,1) \quad (7)$$

The subtracter 214 subtracts the parameter $\Delta_0$, which is set in advance, from the output of the correlator 211. The adder 215 adds the parameter $\Delta_1$ to the parameter $\Delta_2$. The subtracter 216 subtracts the parameter $\Delta_2$ from the parameter $\Delta_1$. The parameters $\Delta_0$, $\Delta_1$, and $\Delta_2$ are values corresponding to an energy difference between the reception signals and defined as the formula (8) by using the Volterra kernel corresponding to the amplification characteristic of the power amplifier 13 as a coefficient.

$$\Delta_0 = -4A^3(h_1(0)h_2(1,1) + h_1(0)h_2(0,0) + h_1(1)h_2(0,1))$$

$$\Delta_1 = 4A^3(h_1(1)h_2(1,1) + h_1(0)h_2(0,1) + h_1(1)h_2(0,0))$$

$$\Delta_2 = 4A^2(A^2h_2(0,1)h_2(1,1) + h_1(0)h_1(1) + A^2h_2(0,0)h_2(0,1)) \quad (8)$$

The adder 217 adds the output of the correlator 212 to the output of the correlator 213. The subtracter 218 subtracts the output of the correlator 213 from the output of the correlator 212. That is, a signal $B_1$ (t) output from the adder 217 and a signal $B_2$ (t) output from the subtracter 218 may be defined as the formula (9).

$$B_1(t) = y(t)(S_1 + S_2)$$

$$B_2(t) = y(t)(S_1 - S_2) \quad (9)$$

The multiplier 219 multiplies the output of the subtracter 214 by a constant 0.5. The subtracter 220 subtracts the output of the subtracter 216 from the output of the adder 217. The adder 221 adds the output of the subtracter 220 to the signal held by the delay unit 228. The nonlinear unit 222 performs the nonlinear calculation that includes a hyperbolic source formula and a logarithm function on the output of the adder 221. The subtracter 223 subtracts the output of the adder 215 from the output of the subtracter 218. The adder 224 adds the output of the subtracter 223 to the signal held by the delay unit 228. The nonlinear unit 225 performs the nonlinear calculation that is equivalent to the nonlinear unit 222 on the output of the adder 224.

The adder 226 adds the output of the nonlinear unit 222 to the output of the nonlinear unit 225. The calculation performed by the adders 215, 221, 224, and 226, subtracters 216, 220, and 223, nonlinear units 222 and 225 may be expressed as a nonlinear function in the formula (10). In the formula (10), p (t) is a signal held by the delay unit 228 at the timing t.

$$F(t) = \ln \cosh(0.5(B_1(t) - (\Delta_1 - \Delta_2) + p(t-1))) + \\ \ln \cosh(0.5(B_2(t) - (\Delta_1 + \Delta_2) + p(t-1)))$$ (10)

The adder 227 adds the output of the multiplier 219 to the output of the adder 226. The output of the adder 226 is output as the signal p (t) indicating the posteriori probability of the transmission signal x (t). The delay unit 228 holds p (t) output from the adder 227 for one symbol time. At this time, the signal p (t−1) may be discarded. In this case, p (t) held by the delay unit 228 is used for distortion compensation of a symbol at a timing t+1. That is, p (t) is used as the posteriori probability to calculated p (t+1). In this case, p (t) is defined as the formula (11) by using the function F (t) defined as the formula (10).

The adder 227 adds the output of the multiplier $$p(t)=F(t)+0.5(y(t)S_0-\Delta_0)$$ (11)

As described above, the linearizer 22 includes a first calculation path that goes through the subtracter 214, a second calculation path that goes through the subtracter 220, and a third calculation path that goes through the subtracter 223, which perform calculation on the same reception signal y (t), respectively. In the first calculation path, the linear calculation using the reference signal $S_0$ and the parameter $\Delta_0$ is performed. In the second and third calculation paths, the linear calculation using the reference signals $S_1$ and $S_2$, the parameters $\Delta_1$ and $\Delta_2$, and the posteriori possibility of the previous symbol is performed, and the nonlinear calculation using the result from the linear calculation as an input is performed. If the output of the first to third calculation paths is subjected to linear addition, the posteriori possibility of the transmission signal x (t) is estimated.

The linearizer 22 feedbacks the posteriori probability estimated for a symbol and uses the posteriori probability for the processing of the following symbol, so that the distortion compensation obtained in consideration of the intersymbol caused by the memory effect is achieved. For the processing of a first symbol that is included in the reception signal, the posteriori probability estimated for the previous symbol may not be used. Therefore, for example, x (t)=+A and x (t)=−A may be assumed to statistically appear in a random order. That is, P(x(t)=+A|y(t))=P(x(t)=−A|y(t))=1/2 and p(0)=0 are assumed. In this case, 0 is stored as an initial value in the delay unit 228.

The above-described linearizer 22 may be called a "turbo linearizer" because the linearizer 22 complies with the "turbo concept." That is, the linearizer 22 improves an estimation accuracy of the posteriori probability of a symbol by using information related to the previous symbol. The linearizer 22 transmits the transmission signal into a plurality of calculation paths, to which noise with no correlation is added, and propagates a reliability of the estimated posteriori probability between the paths. This may increase the estimation accuracy of the posteriori possibility.

Figure 6:
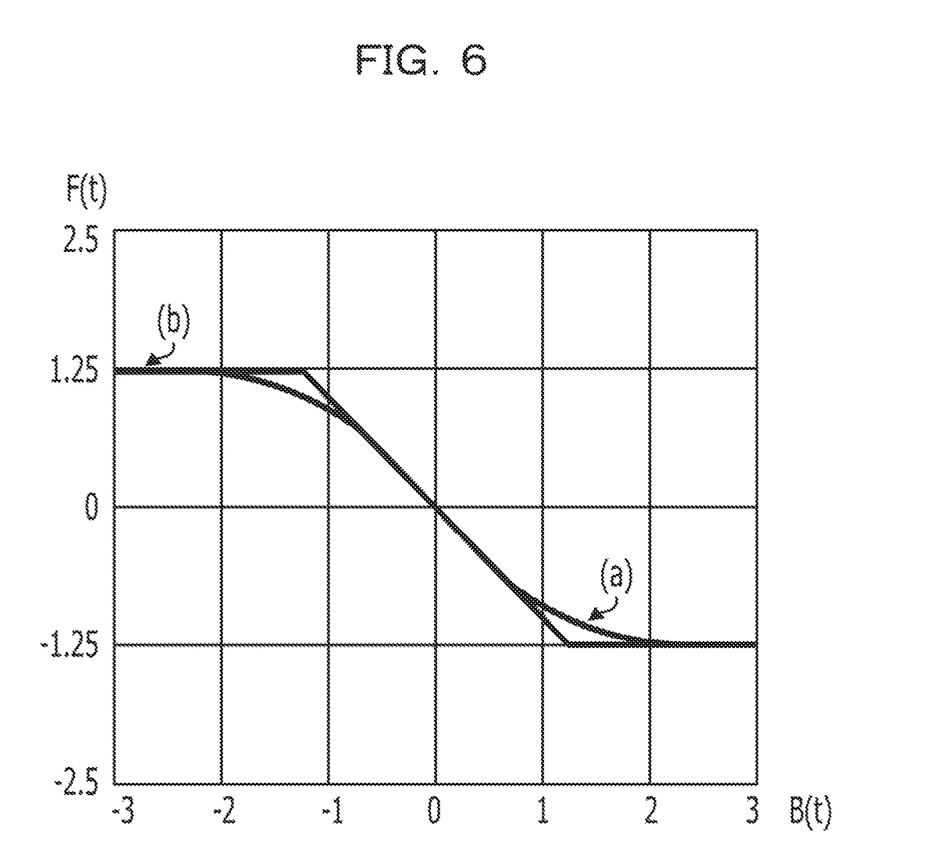
FIG. 6 is a graph illustrating an input and an output of a nonlinear function.

FIG. 6 is a graph illustrating an input and an output of a nonlinear function. The transverse axis of the graph illustrated in FIG. 6 corresponds to input signals $B_1$ (t) and $B_2$ (t) with respect to the subtracters 220 and 223, and the longitudinal axis corresponds to the output of the nonlinear function F (t) illustrated in the formula (10). In this graph, to simplify the description, p (t−1)=0 and $B_1$ (t)=$B_2$ (t) are assumed to be applied.

The curve line (a) indicates an output of the nonlinear function F (t). The curve line (a) includes a linear part (F(t)= +1.25 and F(t)=−1.25 in FIG. 6). The linear part works as an upper limiter and a lower limiter of the output of F (t). The levels of the upper limiter and the lower limiter depend on a Signal to Noise Ratio (SNR) of the parameters $\Delta_1$ and $\Delta_2$ (that is, the Volterra kernel) and the receiving device 20.

The curve line (b) is an example of a linear function obtained by approximating the nonlinear function F (t). To estimate the posteriori probability of each symbol, the linearizer 22 may use the linearizer function illustrated with the curve line (b) instead of the nonlinear function F (t).

Figure 7:
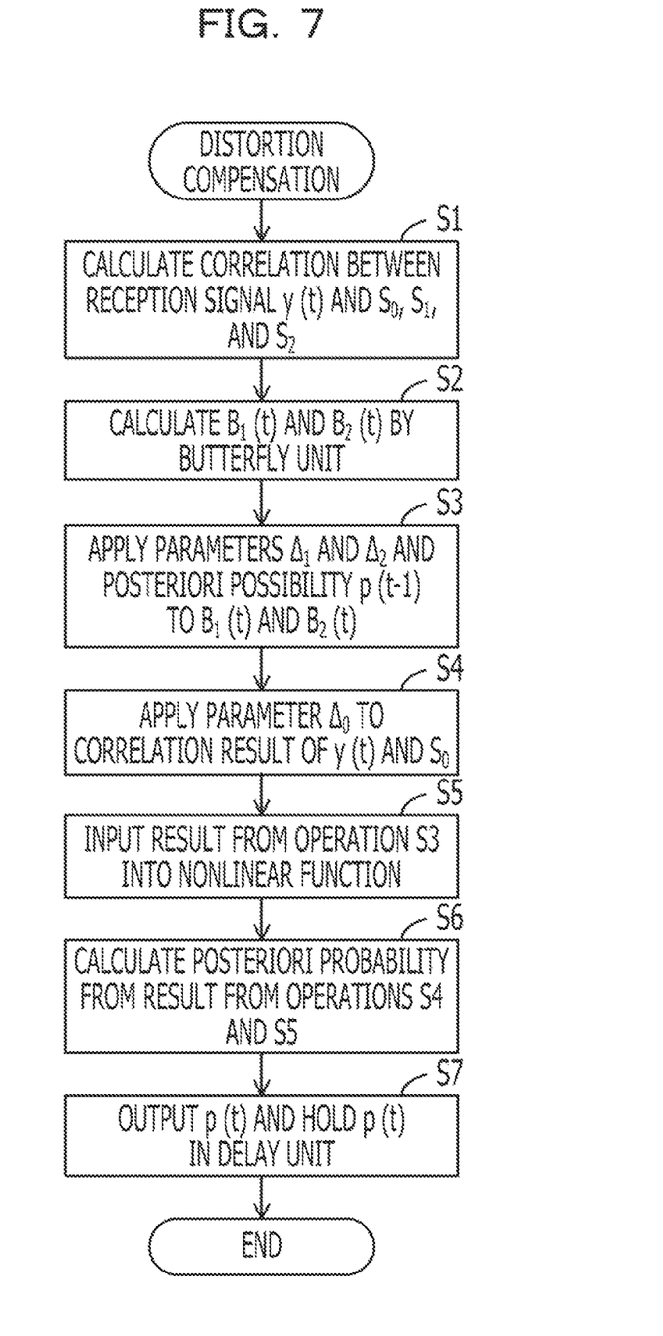
FIG. 7 is a flowchart illustrating distortion compensation in a receiving device.

FIG. 7 is a flowchart illustrating distortion compensation in the receiving device. Processing illustrated in the flowchart is performed on each symbol by the linearizer 22. The processing of distortion compensation will be described below with reference to operation numbers illustrated in FIG. 7.

(Operation S1) The correlator 211 calculates a correlation by multiplying the reception signal y (t) by the reference signal $S_0$. The correlator 212 calculates a correlation by multiplying the reception signal y (t) by the reference signal $S_1$. The correlator 213 calculates a correlation by multiplying the reception signal y (t) by the reference signal $S_2$.

(Operation S2) Based on the outputs from the correlators 212 and 213, the adder 217 and the subtracter (butterfly unit) 218 calculates $B_1$ (t) and $B_2$ (t), respectively. (Operation S3) The subtracter 220 applies the parameters $\Delta_1$ and $\Delta_2$ to $B_1$ (t) calculated in Operation S2. The subtracter 223 applies the parameterts $\Delta_1$ and $\Delta_2$ to $B_2$ (t) calculated in Operation S2. The adder 221 applies the signal p (t−1) held by the delay unit 228 to the output of the subtracter 220. The adder 224 applies the signal p (t−1) to the output of the subtracter 223.

(Operation S4) The subtracter 214 applies the parameter $D_o$ to the output of the correlator 211. (Operation S5) The nonlinear unit 222 performs the nonlinear calculation on the output of the subtracter 221. The nonlinear unit 225 performs the nonlinear calculation on the output of the adder 224. The adder 226 adds the output of the nonlinear unit 222 to the output of the nonlinear unit 225.

(Operation S6) The multiplier 219 multiplies the output of the subtracter 214 by the constant 0.5. The adder 227 calculates p (t) by adding the output of the multiplier 219 to the output of the adder 226.

(Operation S7) The adder 227 outputs p (t), which is calculated in Operation S6, to the delay unit 228 and the hard decision unit 23. The delay unit 228 updates the signal p (t−1) into p (t) output from the adder 227.

The linearizer 22 is not desired to perform the processing in Operations S1 to S7 sequentially. For example, the calculation of the first to third calculation paths may be performed in parallel with each other. Part of the processing in Operation S1 to Operation S7 may be performed in the reverse order, for example.

Figure 8:
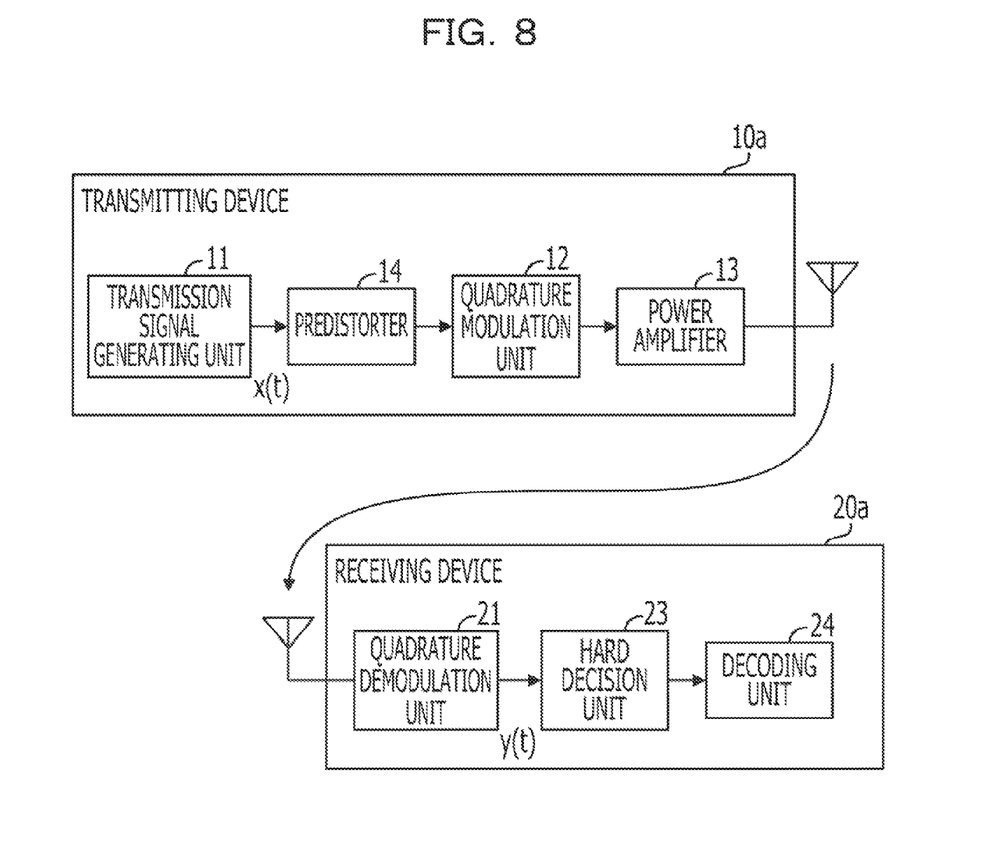
FIG. 8 is a block diagram illustrating an example of another radio communication system.

The accuracy of the distortion compensation is compared between a case where the linearizer 22 is provided in the receiving device and a case where the predistorter is provided in the transmitting device without the linearizer 22 in the receiving device. FIG. 8 is a block diagram illustrating an example of another radio communication system. The radio communication system illustrated in FIG. 8 will be described as a comparison target of the radio communication system according to the second embodiment illustrated in FIG. 2. The radio communication system includes a transmitting device 10*a* and a receiving device 20*a*.

The transmitting device 10a includes the transmission signal generating unit 11, the quadrature modulation unit 12, the power amplifier 13, and a predistorter 14. The predistorter 14 is provided between the transmission signal generating unit 11 and the quadrature modulation unit 12. The predistorter 14 distorts a transmission signal x (t) before inputting the transmission signal x (t) into the quadrature modulation unit 12. The receiving device 20a includes the quadrature demodulation unit 21, the hard decision unit 23, and the decoding unit 24. The linearizer is not provided between the quadrature demodulation unit 21 and the hard decision unit 23.

Figure 9:
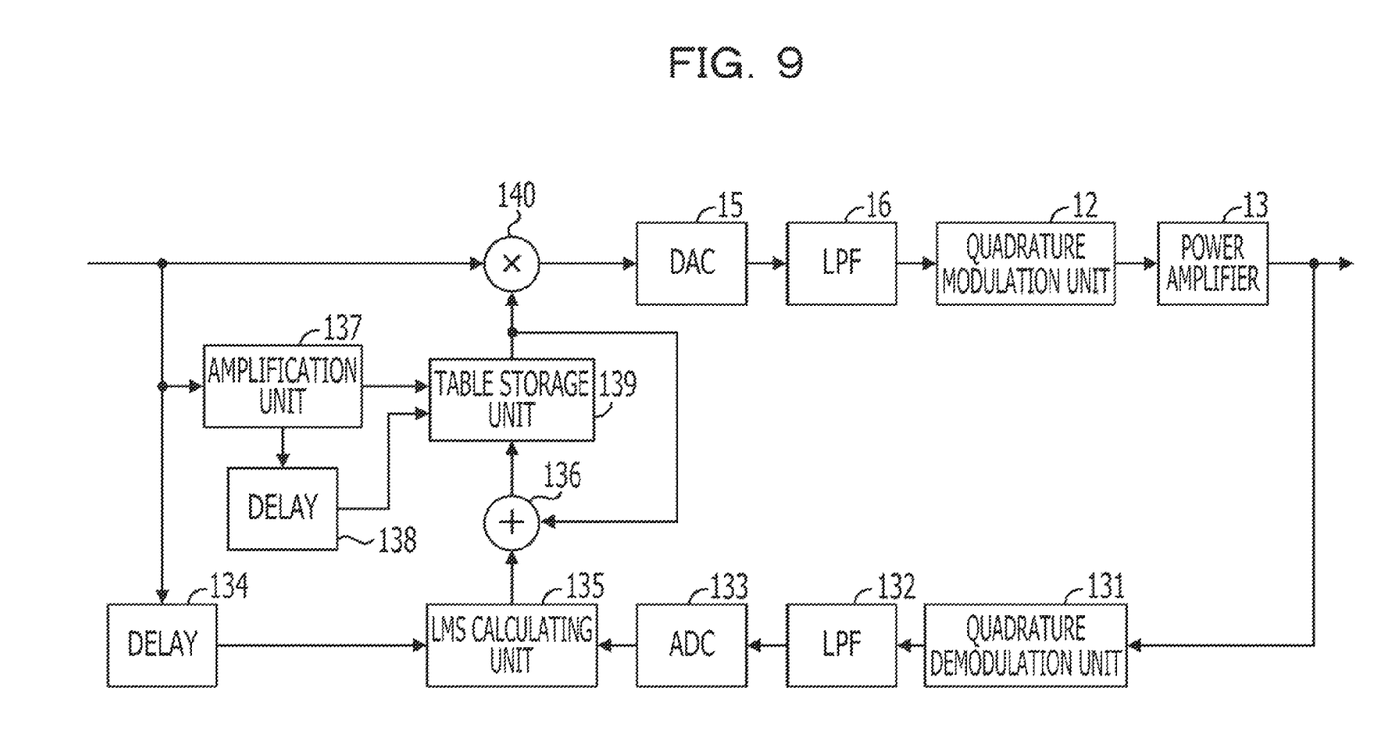
FIG. 9 is a block diagram illustrating an embodiment of a predistorter.

FIG. 9 is a block diagram illustrating an embodiment of a predistorter. The predistorter 14 includes a quadrature demodulation unit 131, an LPF 132, an Analog-Digital Converter (ADC) 133, a delay unit 134, a Least Mean Square (LMS) calculating unit 135, an adder 136, an amplification unit 137, a delay unit 138, a table storage unit 139, and a multiplier 140. In addition to the block illustrated in FIG. 8, the transmitting device 10a includes a Digital-Analog Converter (DAC) 15 and an LPF 16.

The quadrature demodulation unit 131 obtains a high frequency signal output from the power amplifier 13 and down-converts the I component and the Q component, respectively. The LPF 132 performs filtering on a high-frequency component by making a low-frequency component of a signal, which is down-converted by the quadrature demodulation unit 131, go through thereof. The ADC 133 converts the analog signal that goes through the LPF 132 into a digital signal. The delay unit 134 delays the transmission signal. The LMS calculating unit 135 obtains the transmission signal from the delay unit 134 and obtains a feedback signal corresponding to the transmission signal from the ADC 133. By using the least square method, the LMS calculating unit 135 calculates an average difference between the transmission signal and the feedback signal.

The adder 136 adds the difference value calculated by the LMS calculating unit 135 to the compensation value output from the table storage unit 139 and writes back the value in the table storage unit 139. The amplification unit 137 amplifies the transmission signal. The amplification unit 137 outputs, to the table storage unit 139, the transmission signal subjected to the amplification as a reading address of the compensation value stored in the table. The delay unit 138 delays the transmission signal that is amplified by the amplification unit 137. The delay unit 138 outputs the delayed transmission signal as a writing address of the compensation value into the table to the table storage unit 139.

The table storage unit 139 has a Lookup Table (LUT) that stores a compensation value applied to the transmission signal in correspondence to a level of the transmission signal before the compensation. The table storage unit 139 reads out the compensation value associated with the reading address, which is input from the amplification unit 137, and outputs the compensation value to the adder 136 and the multiplier 140. The table storage unit 139 updates the compensation value associated with the writing address input from the delay unit 138 to the value calculated by the adder 136. The multiplier 140 multiplies the transmission signal by the compensation value, which is output from the table storage unit 139, and outputs the result to the DAC 15.

The DAC 15 converts the digital signal subjected to the predistortion into an analog signal. The LPF 16 performs the filtering on the high-frequency component by making the low-frequency component of the analog signal output from the DAC 15 go through thereof and then outputs the signal to the quadrature modulation unit 12. In this manner, linearization by the predistortion method is achieved.

Figure 10:
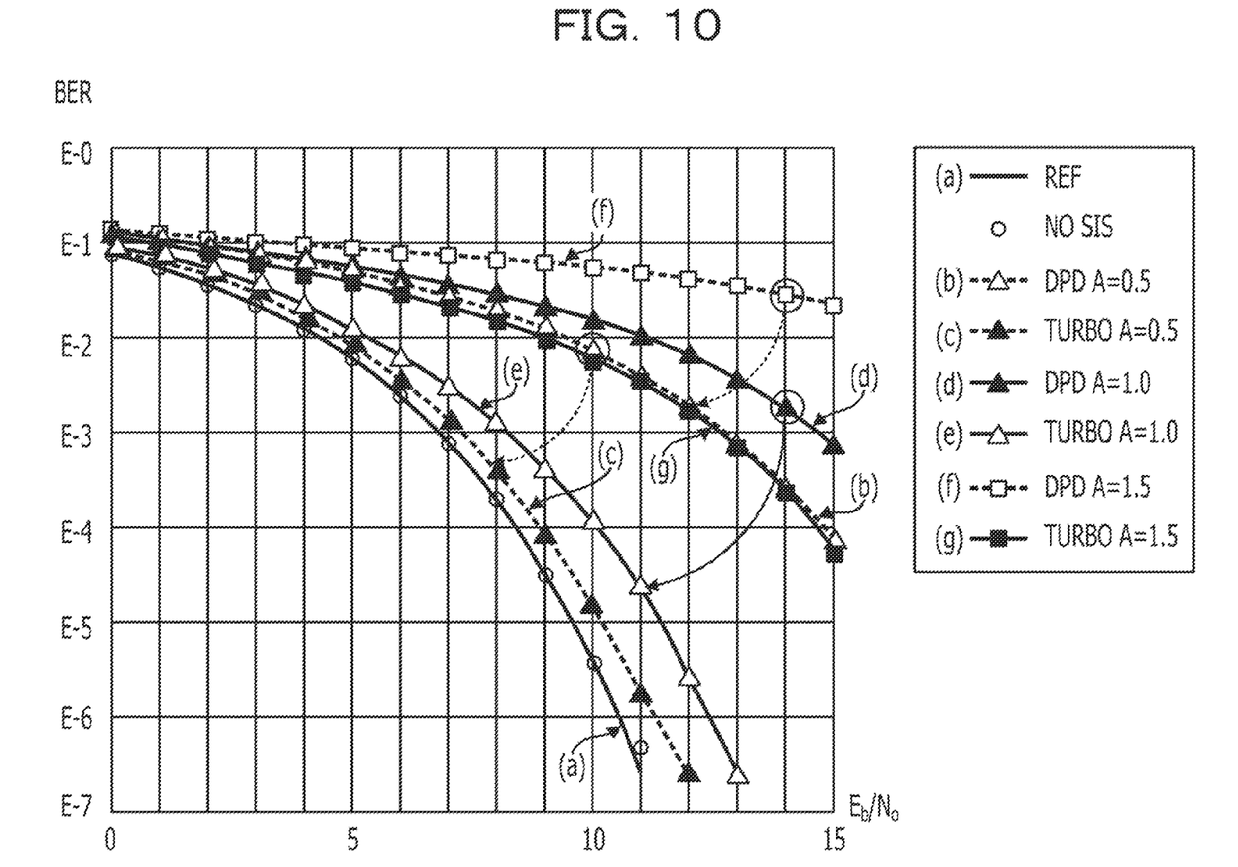
FIG. 10 is a graph illustrating a simulation result of a bit error rate.

FIG. 10 is a graph illustrating a simulation result of a bit error rate. The transverse axis of the graph illustrated in FIG. 10 indicates a ratio of a reception signal level ($E_b$) and a spectrum density ($N_0$) of a back noise level. The longitudinal axis indicates a bit error rate.

The curve line (a) is calculated based on the formula (12). The formula (12) illustrates a model of a transmitting device that transmits an ideal signal with no intersymbol interference. The dots along the curve line (a) indicate results from the simulation in which the ideal power amplifier (that is, $h_1(0)=1$, $h_1(1)=0$, and $h_2(q_1,q_2)=0$) with no intersymbol interference is assumed. As illustrated in the graph, the result of the simulation almost matches the curve line (a) that is calculated based on the formula (12).

$$P_{err} = \frac{1}{2}\mathrm{erfc}\left(\sqrt{\frac{E_b}{N_0}}\right) \quad (12)$$

$$\text{where } \mathrm{erfc}(x) = 1 - \mathrm{erf}(x) = \frac{2}{\sqrt{\pi}}\int_x^\infty e^{-t^2}\,dt$$

The curve lines (b), (d), and (f) indicate the results from the simulation of the bit error rate observed by the receiving device 20a in the radio communication system illustrated in FIGS. 8 and 9. The curve lines (c), (e), and (g) indicate the results obtained by simulating the bit error rate observed by the receiving device 20 in the radio communication system illustrated in FIGS. 2 and 5. The curve lines (b) and (c) indicate the results when a bipolar signal of amplitude A=0.5 is transmitted. The curve lines (d) and (e) indicate the results when the bipolar signal of amplitude A=1.0 is transmitted. The curve lines (f) and (g) indicate the results when the bipolar signal of amplitude A=1.5 is transmitted.

As illustrated in the graph, regarding any of the three amplitudes, the BER in a case where the linearizer 22 according to the second embodiment is used decreases further than in a case where the predistorter 14 is used. Thus, the BER gets close to the ideal BER with no intersymbol interference.

By providing the linearizer 22 in the receiving device 20, a reception quality may be improved. Especially, the BER may be greatly improved in the range of high $E_b/N_0$. If the signal transmitted from the transmitting device 10 has no intersymbol interference, that is, in a case where the Volterra kernel is $h_1(0)=1$, $h_1(1)=0$, and $h_2(q_1, q_2)=0$, the parameter is set to the parameter $\Delta_1=\Delta_2=0$ in the receiving device 20. In this case, the linearizer 22 does not actually perform the nonlinear calculation, so that adverse effect by the linearizer 22 on the reception quality may be avoided. That is, even if the influence of the memory effect of the power amplifier 13 is small, the high reception quality may be maintained.

According to the radio communication system of the second embodiment, the nonlinear distortion caused by the memory effect of the power amplifier 13 may be eased effectively by the receiving device 20. That is, the receiving device 20 feedbacks the result from the distortion compensation of a symbol to compensate the distortion of the following symbol. This may improve the accuracy of distortion compensation even though the reverse characteristic of the amplification characteristic of the power amplifier 13 having the memory effect is not calculated with accuracy. The transmitting device 10 is not desired to include a predistorter mounted with a complex algorithm, and the circuit configuration of the transmitting device 10 may be simplified.

When the linearization of the power amplifier 13 is performed in the receiving device 20, in addition to the distortion generated by the power amplifier 13, the influence of the white Gaussian noise added to the reception signal of the receiving device 20 may be eased. As a result, the reception quality in the receiving device 20 may be effectively improved, and the radio communication with high quality is achieved. The linearizer 22 may be distributed as a circuit component separately from the receiving device 20. A digital signal processing circuit that includes the linearizer 22 may be distributed as an independent circuit component. In this case, the circuit component may be embedded into the receiving device 20 at a latter stage.

The above-described receiving device, the linearizer, and the distortion compensation method may effectively perform the compensation of signal distortion caused by the power amplifier of the transmitting device.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A receiving device comprising:
a receiver configured to receive a signal transmitted from a transmitting device by using a power amplifier; and
a linearizer coupled to the receiver and configured to:
perform distortion compensation on a symbol in the received signal,
hold a signal that relates to a result of the distortion compensation, and
perform the distortion compensation on a second symbol at a tinning later than a first symbol in the received signal based on a coefficient corresponding to an amplification characteristic of the power amplifier and based on the signal which relates to the result of the distortion compensation on the first symbol.

2. The receiving device according to claim 1, wherein the linearizer is configured to perform the distortion compensation that includes performing a nonlinear calculation.

3. The receiving device according to claim 1, wherein the linearizer is configured to hold a signal indicating a posteriori probability calculated for the symbol as the signal which relates to the result of the distortion compensation on the symbol.

4. The receiving device according to claim 1, wherein the linearizer is configured to perform, for each symbol in the received signal, the distortion compensation on the each symbol and processing for updating the held signal by a signal which relates to the result of the distortion compensation on the each symbol.

5. The receiving device according to claim 1, wherein the linearizer is configured to:
perform a first calculation that includes performing a first linear calculation on the symbol,
perform a second calculation that includes performing a nonlinear calculation on the symbol, and
output, as the result of the distortion compensation on the symbol, a result obtained by a second linear calculation using calculation results of the first calculation and the second calculation.

6. The receiving device according to claim 5, wherein the linearizer is configured to perform the second calculation that includes performing a first nonlinear calculation and performing a second nonlinear calculation different from the first nonlinear calculation.

7. The receiving device according to claim 5, wherein the linearizer is configured to perform the second calculation that includes
performing a third linear calculation using the second symbol, the coefficient, and the signal which relates to the result of the distortion compensation on the first symbol, and
performing the nonlinear calculation using calculation results of the third linear calculation.

8. A linearizer comprising:
a calculating unit which performs distortion compensation on a symbol in a reception signal from a transmitting device which transmits the reception signal by using a power amplifier; and
a delay unit which holds a signal that relates to a result of the distortion compensation, and
the calculating unit performing the distortion compensation on a second symbol of a timing later than a first symbol in the reception signal based on a coefficient corresponding to an amplification characteristic of the power amplifier and based on the signal which relates to the result of the distortion compensation on the first symbol.

9. The linearizer according to claim 8, wherein the calculating unit is configured to perform the distortion compensation that includes performing a nonlinear calculation.

10. The linearizer according to claim 8, wherein the delay unit is configured to hold a signal indicating a posteriori probability calculated for the symbol as the signal which relates to the result of the distortion compensation on the symbol.

11. The linearizer according to claim 8, wherein the calculating unit is configured to perform, for each symbol in the received signal, the distortion compensation on the each symbol and processing for updating the held signal by a signal which relates to the result of the distortion compensation on the each symbol.

12. The linearizer according to claim 8, wherein the calculating unit is configured to:
perform a first calculation that includes performing a first linear calculation on the symbol,
perform a second calculation that includes performing a nonlinear calculation on the symbol, and
output, as the result of the distortion compensation on the symbol, a result obtained by a second linear calculation using calculation results of the first calculation and the second calculation.

13. The linearizer according to claim 12, wherein the calculating unit is configured to perform the second calculation that includes performing a first nonlinear calculation and performing a second nonlinear calculation different from the first nonlinear calculation.

14. The linearizer according to claim 12, wherein the calculating unit is configured to perform the second calculation that includes
performing a third linear calculation using the second symbol, the coefficient, and the signal which relates to the result of the distortion compensation on the first symbol, and
performing the nonlinear calculation using calculation results of the third linear calculation.

15. A distortion compensation method comprising:
performing distortion compensation on a first symbol in a reception signal from a transmitting device that transmits the reception signal by using a power amplifier;
holding a signal that relates to a result of the distortion compensation on the first symbol; and
performing, by a linearizer, the distortion compensation on a second symbol in the reception signal at a timing later than the first symbol based on a coefficient corresponding to an amplification characteristic of the power amplifier and based on the signal which relates to the result of the distortion compensation on the first symbol.

16. The distortion compensation method according to claim 15, wherein the distortion compensation includes performing a nonlinear calculation.

17. The distortion compensation method according to claim 15, wherein
the holding holds a signal indicating a posteriori probability calculated for the first symbol as the signal which relates to the result of the distortion compensation on the first symbol.

18. The distortion compensation method according to claim 15, further comprising:
performing, for each symbol in the reception signal, the distortion compensation on the each symbol and processing for updating the held signal by a signal which relates to the result of the distortion compensation on the each symbol.

19. The distortion compensation method according to claim 15, wherein the distortion compensation includes
performing a first calculation that includes performing a first linear calculation on the symbol,
performing a second calculation that includes performing a nonlinear calculation on the symbol, and
outputting, as the result of the distortion compensation on the symbol, a result obtained by a second linear calculation using calculation results of the first calculation and the second calculation.

20. The distortion compensation method according to claim 19, wherein
the performing the second calculation includes performing a first nonlinear calculation and performing a second nonlinear calculation different from the first nonlinear calculation.

21. The distortion compensation method according to claim 19, wherein
the performing the second calculation includes
performing a third linear calculation using the second symbol, the coefficient, and the signal which relates to the result of the distortion compensation on the first symbol, and
performing the nonlinear calculation using calculation results of the third linear calculation.

* * * * *